(12) United States Patent
Dombkowski et al.

(10) Patent No.: US 6,298,065 B1
(45) Date of Patent: *Oct. 2, 2001

(54) METHOD FOR MULTI-MODE OPERATION OF A SUBSCRIBER LINE CARD IN A TELECOMMUNICATIONS SYSTEM

(75) Inventors: Kevin Eugene Dombkowski, Oswego; Charles Arthur Witschorik, Naperville, both of IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,175

(22) Filed: Aug. 29, 1997

(51) Int. Cl.[7] ................................................. H04L 12/28
(52) U.S. Cl. ..................................... 370/420; 370/433
(58) Field of Search ................................... 370/433, 420, 370/421, 468, 412, 437, 465; 379/93.01, 93.06, 93.09, 93.11

(56) References Cited

U.S. PATENT DOCUMENTS

| | | | |
|---|---|---|---|
| 4,577,314 | 3/1986 | Chu et al. | 379/94 |
| 5,058,111 * | 10/1991 | Kihara et al. | 370/420 |
| 5,479,498 | 12/1995 | Brandman et al. | 379/283 |
| 5,812,534 * | 9/1998 | Davis et al. | 370/260 |
| 5,910,970 * | 6/1999 | Lu | 375/222 |
| 5,920,563 * | 6/1999 | Fukui et al. | 370/395 |

OTHER PUBLICATIONS

B. S. Bosik, "Time–compression Multiplexing, Squeezing Digits Through Loops", *At& T Bell Laboratories Record*, Feb. 1984, pp. 22–25.

*Computer Networks—Protocols, Standards and Interfaces*, Prentice–Hall, Inc., 1987, pp. 298–301.

* cited by examiner

*Primary Examiner*—Chau Nguyen
*Assistant Examiner*—Phuongchau Ba Nguyen
(74) *Attorney, Agent, or Firm*—Mony Ghose; John B. Mac Intyre

(57) ABSTRACT

A method and system for decreasing the probability of blocked access to a local exchange carrier's telecommunications network comprises a multi-mode line card for determining whether a particular call is a voice or data call. If a call is determined to require data transmission, the line card assigns time slots for interconnection of the line card to a serving digital switch. If no meaningful data is received, no time slots are assigned. In this manner, time slots interconnecting the serving digital switch to a line card are established only if data or voice is being transmitted from a subscriber line.

10 Claims, 2 Drawing Sheets

METHOD FOR MULTI-MODE OPERATION OF A SUBSCRIBER LINE CARD IN A TELECOMMUNICATIONS SYSTEM

TECHNICAL FIELD

This invention relates to telecommunications systems, and more particularly, to providing subscriber line cards deployed in such telecommunications systems.

BACKGROUND OF THE INVENTION

Telecommunications has evolved from transmitting only voice to a multimedia vehicle for communication. Modern users of telecommunications services are supported by subscriber lines which not only transmit voice but also send data transmissions generated by facsimiles and Internet access. A common implementation of a modem subscriber line interconnects a twisted cable pair from a subscriber's customer premises equipment to a subscriber line card associated with a digital switching system. The line card provides functions of battery, overvoltage protection, ringing, supervision, hybrid and testing (commonly referred to as the BORSHT functions) and converts analog voice band frequencies into a stream of pulse code modulation octets carried at 64 kilobits per second across the digital switching system and the rest of the public-switched telecommunications network (PSTN).

Current line card implementations operate in a mode for optimizing voice transmission. The transmission of data signals requires use of modulator/demodulator devices (modems) for transforming digital data signals into analog signals which are carried within the standard voice band frequency limitations of the telecommunications network. Current voice band frequency limitations of the PSTN hold the per subscriber line modem data transmission rate to approximately 56 kilobits per second. Unfortunately, the 56 kilobits per second transmission rate is unacceptably slow for many telecommunications service subscribers who routinely send data via the PSTN. To obtain higher transmission rates, it is common for these subscribers to bind two or more analog subscriber lines together through special modems working in the role of inverse multiplexers. Special modems, or any increase in the number of lines used per subscriber, are problematic because of the increase in average holding time of all telephone calls served by the switch. Further, increased subscriber line usage invalidates current standards for concentration of subscriber lines per switch and the provisioning of intraswitch time slot facilities.

The real-life impact of an increase in concentration of subscriber lines per switch is the more frequent denial of dial tone or the receipt of busy signals by subscribers who are accustomed to consistent and reliable access to the PSTN. The current state of subscriber line concentration is especially troubling since switch resources are unnecessarily occupied. This is because a significant amount of data transmissions between a subscriber line and the PSTN carry idle data (that is, non-useful packets of information) which is a well known and common phenomenon of data connections. Therefore there is a need in the art for decreasing the occurrence of blocked access to the telecommunications network while efficiently accommodating prolonged data transmissions.

SUMMARY OF THE INVENTION

This need is addressed and a technological advance is achieved in the telecommunications art by a multi-mode line card for determining and establishing a mode of operation consistent with subscriber needs. More particularly, a multi-mode subscriber line card operates in a packet transmission mode (hereinafter referred to as "mode 2") for allowing a faster bit rate transmission from a line card to a digital switching system but can be automatically switched to a voice only transmission mode (hereinafter referred to as "mode 1"). Other modes of operation may accommodate new voice companding techniques or packet transmission of compressed voice signals.

In the preferred embodiment, the multi-mode line card serves a plurality of subscribers in a local telecommunications system. When off-hook status is detected by a subscriber line interface circuit, a determination is made as to whether a distinct packet mode initiation signal is received within a predetermined time period. If no such signal is received, the subscriber line operates in mode 1 in which well-established filtering, sampling and companding standards are used for voice transmissions.

If a packet mode initiation signal is received, the multi-mode line card establishes filters, analog-to-digital (A/D) sampling and line coder/decoders for receiving and decoding packet transmissions in mode 2. The parameters of the filters, A/D sampling and coding are established in an exchange with customer premises equipment initiating the packet call. A packet protocol exchange, which occurs between the line card and the customer equipment for the duration of the packet mode state, allows the removal and insertion of packets to and from the subscriber line via a packet queue. The packet queue is shared across multiple subscriber line interface circuits and reduces the number of circuit resources which must be held active during packet mode calls. A shared transmission capacity (hereinafter referred to as a "packet link") is used for reading and writing packets of data into and out subscriber line associated queues. Advantageously, prolonged periods of non-useful data transmission, such as when a user is simply viewing information received on a personal computer but not actively sending data, are not transmitted to the digital switch. The transmission of only meaningful data decreases the inefficient use of intraswitch time slot facilities and minimizes the prevention of other users from transmitting useful data In this manner, subscriber line congestion is reduced by effectively allocating switch resources.

DETAILED DESCRIPTION

Figure 1:
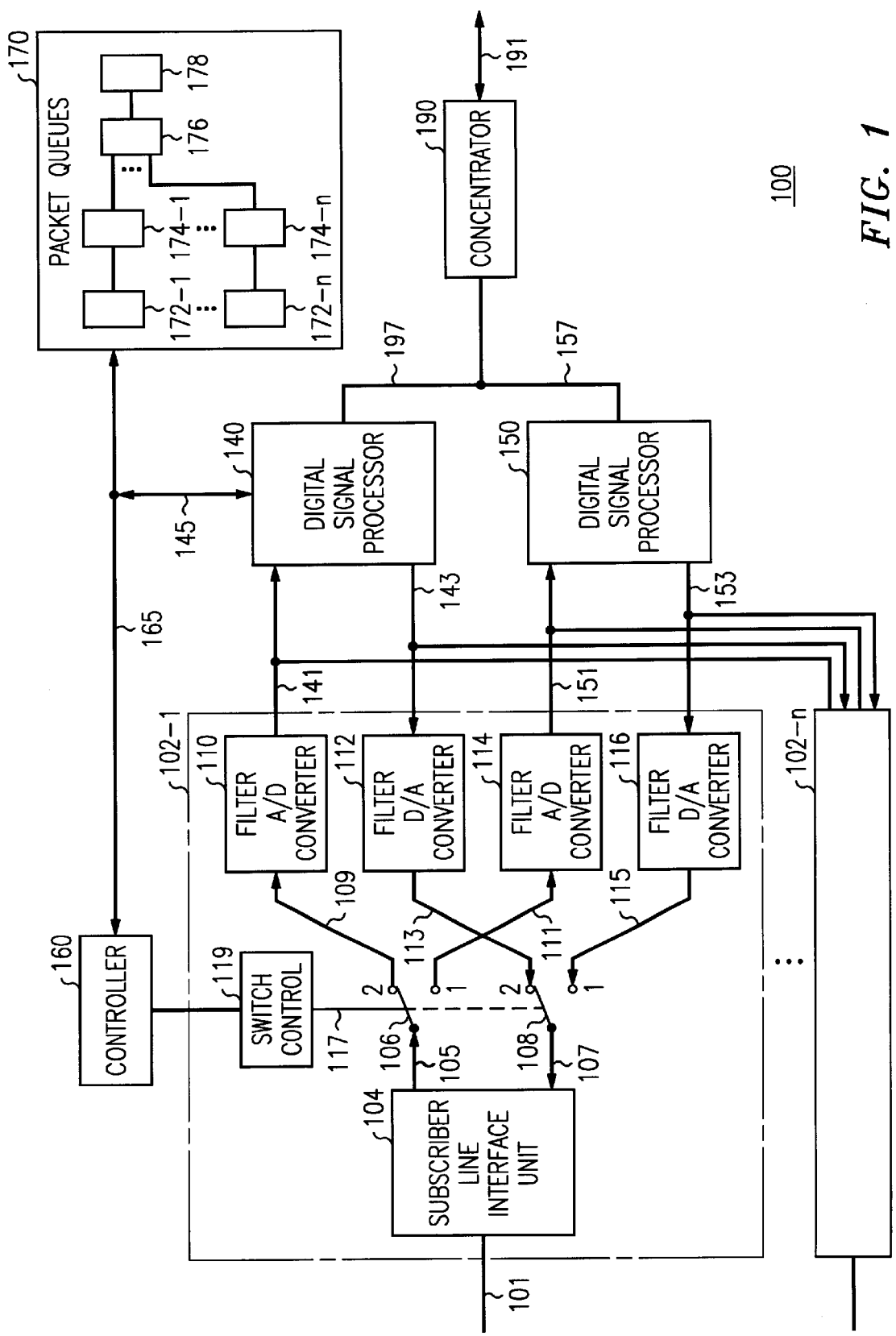
FIG. 1 is a simplified block diagram of a subscriber line card and associated systems in which the present invention may be practiced.

FIG. 1 shows subscriber line card 100 including per line circuitry 102-1, mode 2 digital signal processor (DSP) 140, mode 1 DSP 150, controller 160, packet queue 170 and concentrator mechanism 190. In the embodiment shown, per line circuitry 102-1 serves subscriber line 101 and is interconnected to a PSTN-connected digital switching system (not shown) via concentrator mechanism 190 and intraswitch time slot facility 191. In an operational embodiment, there are a plurality of subscriber lines each with its own circuitry served by mode 2 DSP 140, mode 1 DSP 150, controller 160, packet queue 170 and concentrator mechanism 190. For illustrative purposes, however, circuitry associated with a single subscriber line (that is, per line circuitry 102-1) is described below but existence of up to "n" subscriber lines and associated circuitry is represented by per line circuitry 102-n.

Per line circuitry 102-1 comprises subscriber line interface circuit 104 interconnected to receive mode switch 106 and transmit mode switch 108 via low voltage interfaces 105 and 107, respectively. Subscriber line interface circuit 104 serves as a conduit between subscriber line 101 and the digital switching system. More particularly, subscriber line interface circuit 104 detects on/off hook status of customer premises equipment associated with subscriber line 101 and provides sufficient bandwidth capability so that the subscriber line is operable in either mode 1 or mode 2. In this regard, links 109 and 113 are designated packet mode data links while links 111 and 115 are voice transmission mode links. All voice transmissions or packet transmissions emanating from subscriber line 101 are directed to receive mode switch 106 and all transmissions directed to subscriber line 101 are handled by transmit mode switch 108.

Mode 1 operation requires receive mode switch 106 to complete a connection between analog-to-digital (A/D) converter 114 and data link 105. In transmit mode, switch 108 completes a connection to digital-to-analog (D/A) converter 116 via data link 107. Mode 2 filter and A/D converter 110 is interconnected to receive mode switch 106 via packet mode link 109 while mode 2 filter and D/A converter 112 is interconnected to the switch 108 via packet transmission link 113. Mode 1 filter and A/D converter 114 is interconnected to receive mode switch 106 via voice transmission link 111 and mode 1 filter and D/A converter 116 is interconnected to transmit mode switch 108 via voice transmission link 115.

Mode 2 is the default mode of operation for receive mode switch 106 and transmit mode switch 108. In the preferred embodiment, mode 2 operation is commenced when a signal is received from the customer premises equipment associated with subscriber line 101. Such a packet mode signal is transmitted via filter/converter 110 and mode 2 DSP 140 to controller 160. If packet mode signal is not received within a predefined time period, controller 160 initiates mode 1 operation by extending a control signal to switch control 119 via control link 117. Upon receipt of the control signal, switch control 119 issues an alter switch signal to receive mode switch 106 and transmit mode switch 108 such that these switches assume a mode 1 position (that is, a position which completes an interconnection between low voltage interfaces 105, 107 and filter/converters 114 and 116, respectively).

Mode 2 DSP 140 is interconnected to filter/converter 110 and filter/converter 112 via links 141 and 143, respectively. Similarly, mode 1 DSP 150 is interconnected to filter/converters 114 and 116 via data links 151 and 153, respectively. In the preferred embodiment, mode 2 DSP 140 is interconnected to controller 160 and packet queue 170 via packet link 145. Controller 160 and packet queue 170 are interconnected via link 165. In an operational embodiment, mode 2 DSP 140 and mode 1 DSP 150 serve a plurality of subscriber lines. Accordingly, packet link 145 is a conduit between packet queue 170 and a plurality of subscriber lines. Packet queue functionality is described in U.S. Pat. No. 4,577,314 assigned to AT&T Bell Laboratories and incorporated by reference herein. For illustrative purposes, the interaction of a single subscriber line (that is, subscriber line 101) and packet queue 170 is described.

Packet queue 170 includes a plurality of pairs of subscriber line buffers 172-1 and 174-1 through 172-n and 174-n. Indeed, each subscriber line associated with subscriber line card 100 has its own designated pair of subscriber line buffers. Network buffers 176 and 178 store data received from or going to the serving digital switch via concentrator mechanism 190. In the embodiment shown, there are two network buffer queues per "n" subscriber lines. Alternative embodiments may include more than two network buffers for the "n" subscriber lines associated with subscriber line card 100.

During mode 1 operation, analog voice signals are received in subscriber line interface circuit 104 from subscriber line 101 and processed by A/D converter 114 before delivery to mode 1 DSP 150 via data link 151. Mode 1 DSP 150 is interconnected to data link 197 and concentrator mechanism 190 via connector link 157. As known in the art, mode 1 DSP 150 processes voice signals and extends these signals to concentrator mechanism 190 via data link 157 so that an appropriate time slot can be assigned for delivery of the signals to the serving digital switch via intraswitch time slot facility 191. Since voice signal processing is well known, no further discussion of mode 1 operation will be undertaken herein. During mode 2 operation, controller 160 coordinates transmission of data packets between subscriber line 101 and the serving digital switching system via mode 2 DSP 140. Packet queue 170, including buffers 172-1, 174-1, 176 and 178, are accessed by mode 2 DSP 140 as directed by control information received from controller 160 via data links 165 and 145.

Figure 2:
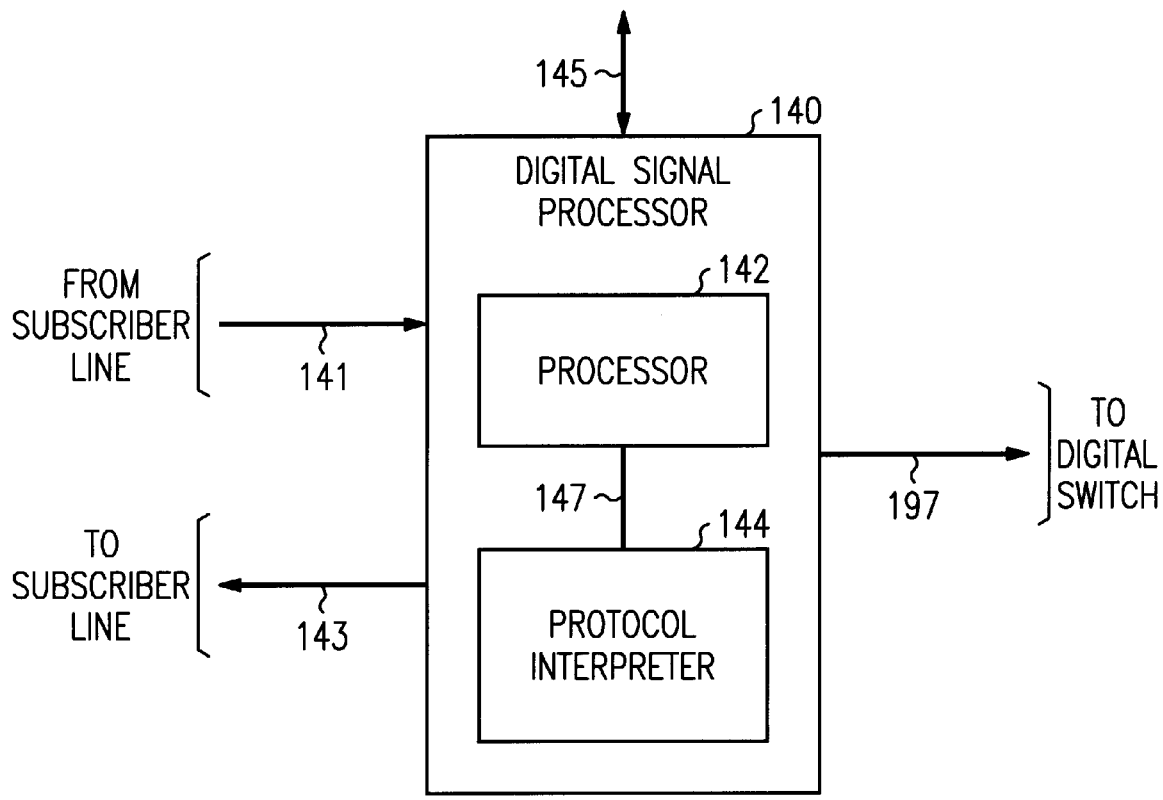
FIG. 2 is a more detailed block diagram of a digital signal processor shown in FIG. 1.

FIG. 2 shows a more detailed view of mode 2 DSP 140 and its operation in accordance with the preferred embodiment of the present invention. Mode 2 DSP 140 includes processor 142 interconnected to protocol interpreter 144 via data link 147. Mode 2 data packet transmission operation is commenced soon after a packet mode signal is received from the customer premises equipment associated with subscriber line 101 in subscriber line interface circuit 104. More particularly, subscriber line interface circuitry 104 transmits the packet mode signal to receive mode switch 106 and filter/converter 110 via interface 105 and data link 109, respectively. The packet mode signal is extended to mode 2 DSP 140 which passes the signal to controller 160 via packet links 145 and 165. Upon receipt of the packet mode signal, controller 160 identifies a subscriber line buffer, such as buffer 172-1 as a holding queue for receiving data packets transmitted from subscriber line 101 during packet mode transmission.

Data received from subscriber line 101 via receive mode switch 106 and filter/converter 110 is processed by digital signal processor 142 using information stored in protocol interpreter 144. More particularly, protocol interpreter 144 is initialized with information for determining whether packet information received from the subscriber line contains meaningful data (that is, data which should be extended to the serving digital switch via concentrator mechanism 190) or whether the packet information received is non-useful data such as idle data packets which do not contain information the subscriber needs. For example, non-useful information may simply be an identification or "hand shake" signal. Protocol interpreter 144 ensures that all meaningful data is extended from digital signal processor 140 to a subscriber line buffer over packet link 145 and data link 165. At predetermined time intervals, controller 160 accesses subscriber line buffer, such as buffer 172-1 and moves data stored therein into a network buffer, such as network buffer 176. Simultaneously, controller 160 directs mode 2 DSP 140 to remove information stored in network buffer 176 and forward it to concentrator mechanism 190 via packet link 145 and data link 197.

Packet transmissions may also be received from the PSTN in mode 2 operation. These data transmissions are received in concentrator mechanism 190 via intraswitch time slot facility 191 and forwarded to mode 2 DSP 140 over data link 197. Upon receipt of data transmissions from concentrator mechanism 190, mode 2 DSP 140 accesses controller 160 for instructions which identify the network buffer in which the received data transmission should be stored. In this example, controller 160 directs mode 2 DSP to store received data transmissions in network buffer 178. The received data includes address information identifying to which subscriber line the data is directed. Controller 160 reads this address information contained in the received data transmission and transports the received data to an appropriate subscriber line buffer. In this example, controller 160 transfers data currently stored in network buffer 178 to a subscriber line buffer such as buffer 174-1. Each subscriber line has at least two buffers so that one buffer may be designated as an outgoing data queue (e.g. 172-1) and another designated an incoming data queue (e.g. 174-1). Simultaneously, controller 160 extends a message to mode 2 DSP 140 via packet link 145 indicating that data directed to subscriber line 101 has been received and is currently stored in subscriber line buffer 174-1. Accordingly, mode 2 DSP 140 retrieves the information stored in subscriber line buffer 174-1 and transmits it to subscriber line 101 via filter/converter 112 and transmit mode switch 108. Significantly, mode 2 DSP 140 uses protocol interpreter 144 to analyze all incoming data transmissions received from concentrator 190 to determine whether the data transmission contains meaningful data or non-useful, idle data. Only meaningful data is transmitted to subscriber line 101. Non-useful data is discarded (that is, it is saved in an erasable memory).

Advantageously, the present invention eliminates the transmission of non-useful data traffic between subscriber lines and a serving digital switching system. Further, a single subscriber line is effectively used to originate voice transmissions or exchange a high speed data transmissions. Indeed, the use of packet queue 170 analysis performed by protocol interpreter 144 to determine the content of data transmission enables intraswitch time slot facilities and resources associated with subscriber lines to be used efficiently. This results in the minimization of blocked calls and subscriber line congestion.

Although the invention has been illustrated with respect to a preferred embodiment, those skilled in the art will recognize that numerous other arrangements may be devised without departing from the scope of the invention.

The invention claimed is:

1. A method for multi-mode operation of a subscriber line interface unit in a telecommunications system, the method comprising the steps of:
   receiving a first signal from a customer premises equipment (CPE) at a subscriber line interface unit associated with the CPE, the first signal initiating a communication;
   starting a timer;
   upon receiving a packet mode signal from the CPE prior to expiration of the timer, operating in a data transmission mode; and
   operating in voice only transmission mode if the packet mode signal is not received from the CPE prior to the expiration of the timer.

2. A method for multi-mode operation of a subscriber line interface unit in a telecommunications system in accordance with claim 1, the method further comprising the steps of:
   upon determination to operate in the data transmission mode, identifying whether a received transmission from the subscriber line interface unit contains data;
   selectively storing data; and
   periodically extending the data to a switch in the telecommunications system.

3. A method for multi-mode operation of a subscriber line interface unit in a telecommunications system in accordance with claim 2, wherein the step of selectively storing data comprises extending a portion of the data over a shared transmission capacity to a designated subscriber line buffer.

4. A method for multi-mode operation of a subscriber line interface unit in a telecommunications system in accordance with claim 2, wherein the step of periodically extending data to the switch in the telecommunications system comprises responding to a control signal from a controller interconnected to a subscriber line buffer.

5. A method for multi-mode operation of a subscriber line interface unit in a telecommunications system in accordance with claim 2, wherein the step of periodically extending data to the switch in the telecommunications system comprises extending only meaningful data to the switch.

6. A subscriber line card for use in a telecommunications system comprising:
   a multi-mode subscriber line interface unit;
   a packet transmission mode digital signal processor (DSP) interconnected to the multi-mode subscriber line interface unit and to a controller via a packet link, the packet transmission mode DSP operating in a data transmission mode subsequent to a packet mode signal received from customer premises equipment (CPE); and
   a voice only transmission mode DSP interconnected to the multi-mode subscriber line interface unit, the voice only transmission mode DSP operating in a voice only mode when the packet mode signal is not received from the CPE.

7. A subscriber line card for use in a telecommunications system in accordance with claim 6, further comprising a packet queue interconnected to the controller and the packet transmission mode DSP, the packet queue accepting data forwarded from the packet transmission mode DSP.

8. A subscriber line card for use in a telecommunications system in accordance with claim 6, wherein the controller minimizes the likelihood of call blocking.

9. A subscriber line card for use in a telecommunications system in accordance with claim 6, wherein the packet queue contains a plurality of network buffers for storing information received from the public switched telecommunications network.

10. A subscriber line card for use in a telecommunications system in accordance with claim 6, further comprising means for receiving the packet mode signal from customer premises equipment associated with the subscriber line.

* * * * *